United States Patent [19]

Brice

[11] Patent Number: 5,259,708
[45] Date of Patent: Nov. 9, 1993

[54] KEY CUTTING MACHINE HAVING MANUAL AND AUTOMATIC MODES OF OPERATION

[75] Inventor: Henry Brice, Elm City, N.C.
[73] Assignee: Ilco Unican Inc., Montreal, Canada
[21] Appl. No.: 987,009
[22] Filed: Dec. 7, 1992
[51] Int. Cl.⁵ .............................................. B23C 3/35
[52] U.S. Cl. ....................................... 409/81; 409/83
[58] Field of Search ...................... 409/81, 83; 76/110

[56] References Cited

U.S. PATENT DOCUMENTS

| | | | |
|---|---|---|---|
| 1,775,921 | 9/1930 | Williams | 409/81 |
| 2,098,728 | 11/1937 | McPhee | 409/81 |
| 3,196,750 | 7/1965 | Moessner et al. | 409/83 |
| 4,592,683 | 6/1986 | Wu | 409/83 |

FOREIGN PATENT DOCUMENTS 935702  10/1955  Fed. Rep. of Germany ........ 409/81

*Primary Examiner*—Daniel W. Howell
*Attorney, Agent, or Firm*—Ladas & Parry

[57] ABSTRACT

A key cutting machine having manual and automatic modes of operation includes a shaft, a pivotal carriage on the shaft with clamps for a master key and a blank key, the master key facing a tracer bar and the blank key facing a cutter. A spring acts between the carriage and the shaft and a latch system, operated by a trigger selectively locks the carriage and shaft for common rotation for a manual key cutting operation in which the force of the spring is disengaged from the carriage or unlocks the carriage and shaft so that the carriage is urged by the spring to bring the master key into contact with the tracer bar and the blank key into contact with the cutting. A drive system axially moves the shaft and the carriage therewith past the tracer bar and the cutter in the automatic key cutting operation.

23 Claims, 5 Drawing Sheets

KEY CUTTING MACHINE HAVING MANUAL AND AUTOMATIC MODES OF OPERATION

FIELD OF THE INVENTION

The invention relates to a key cutting machine having manual and automatic modes of operation.

BACKGROUND

In manual operation of a key cutting machine, a master key with a key pattern cut therein is placed in a vise or clamp on a carriage and a blank key in which the pattern on the master key is to be cut is placed in an adjacent vise or clamp on the carriage. The master key faces a stylus or tracer bar and the blank key faces a cutter wheel. The carriage is pivotably moved on a supporting shaft to press the master key against the tracer bar and the blank key against the cutter wheel. The carriage is then manually shifted laterally causing the pattern on the master key to travel on the tracer bar and impart corresponding pivotal movement to the carriage so that the cutter wheel cuts a key pattern in the blank corresponding to the pattern on the master key. The blank key now cut with the pattern is removed from its vise and buffed on a buffing wheel to remove burrs.

In an automatic operation, the carriage is elastically biased to press the master key against the tracer bar and the blank key against the cutter wheel and the carriage is automatically shifted laterally to produce traversal of the master key past the tracer bar and the blank key past the cutter wheel. The blank key is cut in a manner similar to that in the manual operation except automatically.

SUMMARY OF THE INVENTION

An object of the invention is to provide a key cutting machine which can be selectively operated in manual or automatic modes of operation.

A further object of the invention is to provide such a key cutting machine which is of simple construction, easy to operate and reliable in its operation.

Another object of the invention is to provide such a machine which employs a spring means to urge the carriage to an operative position in which the blank key is pressed against the tracer bar, and wherein in manual operation, the spring means is disengaged and the carriage is free to be pivotably moved by the operator between its operative and inoperative positions without resistance by the spring means.

Yet another object of the invention is to provide such a machine in which the manual operation and the change between manual and automatic operations can be carried out with one hand of the operator.

In order to satisfy the above and further objects, the invention provides a key cutting machine having manual and automatic modes of operation which comprises a shaft, a pivotal carrier on the shaft, key clamp means on the carriage for respectively clamping a master key and a blank key thereon, cutting means for cutting the blank key, spring means between the carriage and the shaft for urging the same to undergo relative rotation, latch means having one state for locking the carriage and the shaft for common rotation for a manual key cutting operation and a second state in which the carriage is urged by the spring means towards the cutting means for an automatic key cutting operation, and drive means for axially moving the shaft and the carriage therewith during the automatic key cutting operation.

In further accordance with the invention, a handle is provided on the carriage to manually move the carriage during the manual key cutting operation, the latch means including a trigger for changing the states of operation.

According to a feature of the invention, the trigger and the handle are juxtaposed to be operable by one hand of the user.

In further accordance with the invention, the drive means acts on the shaft to pull the shaft axially past the cutting means.

In further accordance with the invention, the latch means comprises a movable latch pin having a first position in which the shaft and the carriage are locked against relative rotation and a second position in which the shaft and carriage are unlocked and can undergo relative rotation under the action of the spring means.

In further accordance with the invention, the drive means is connected to the shaft through a link mechanism which is effective to transmit the drive from a drive motor to the shaft during the automatic mode of operation and which permits the shaft to freely rotate during the manual mode of operation.

DETAILED DESCRIPTION OF A PREFERRED EMBODIMENT

Figure 5:
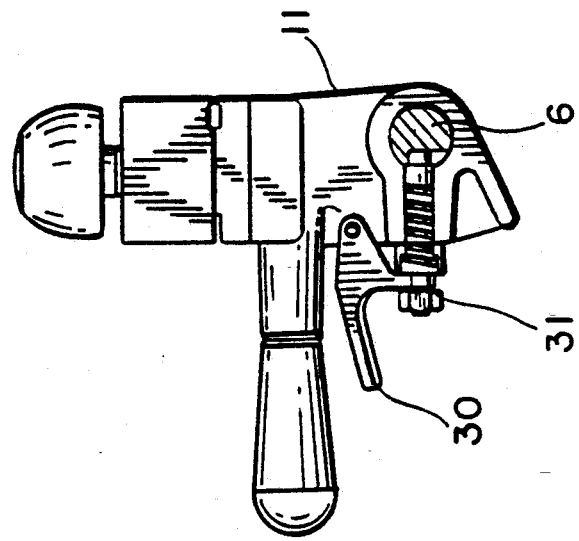
FIG. 5 shows a detail of internal elements of the latching means of the machine in the state in FIG. 4.
Figure 4:
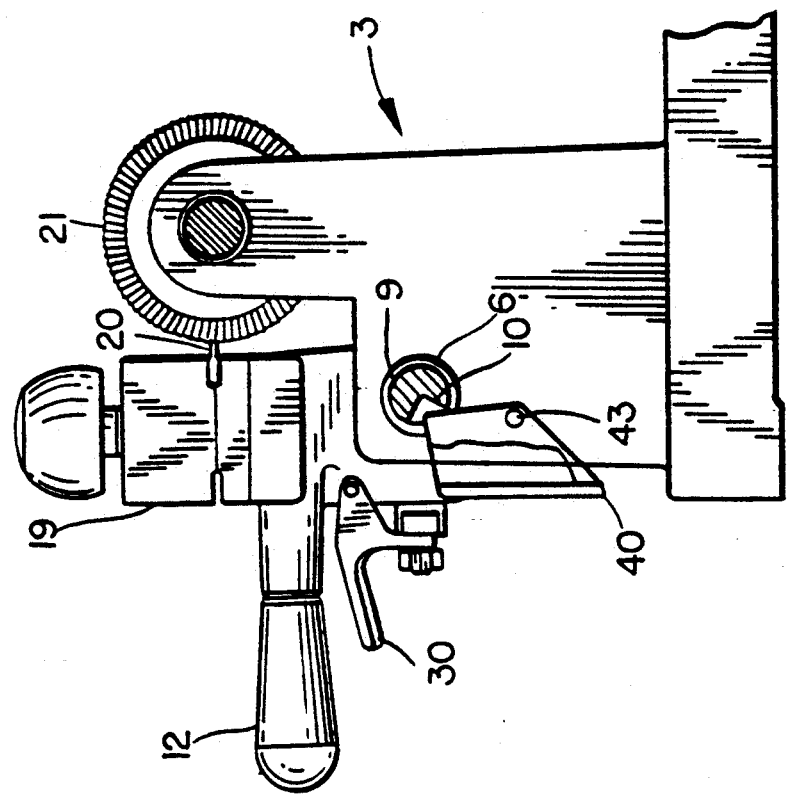
FIG. 4 shows the machine in FIG. 2 in an operative state for manually cutting a key.

Referring to the drawing, therein is shown a key cutting machine 1 adapted for manual and automatic modes of operation. The machine comprises a base 2 on which is fixed a frame 3 having upright opposed cheeks 4 and 5. A shaft 6 is mounted in bearings 7 in the cheeks 4 and 5 so that the shaft 6 is rotatable and slidable in the bearings. The shaft 6 is cylindrical except at its right end 8 in FIG. 1 where the left lower quadrant of the cylindrical shaft is cut away as seen in FIGS. 2, 4 and 5 to form notch surfaces 9 and 10 extending at right angles to one another. A carriage 11 is rotatably supported on shaft 6 and is axially secured to the shaft. A handle 12 extends from the carriage 11 and is manually engageable by an operator to pivot the carriage between a first tilted, inoperative position shown in FIG. 2 and a second upright, operative position as shown in FIG. 4.

A vise or clamp 13 having a wing nut 14 serves for securing a master key 15 in a position adjacent to a tracer bar or stylus 16 fixed in a support 17 on the frame 3. A key pattern 18 of teeth and grooves on the blade of the master key 15 contacts the tracer bar 16. The pattern 18 can be of many different forms and it is only necessary for there to be a variation in the edge of the blade of the key for the machine to be capable of duplicating the pattern on a blank key. A vise or clamp 19 is mounted on the carriage in laterally spaced relation from vise 13 for holding a blank key 20 in which a pattern is to be cut in correspondence with the pattern 18 on the master key 15. When the carriage is in its upright position, the blank key faces a cutter wheel 21 which serves to cut the pattern into the blank key 20. A wing nut 22 is mounted on the vise 19 to control the locking and unlocking of the blank key 20 in vise 19.

Figure 6:
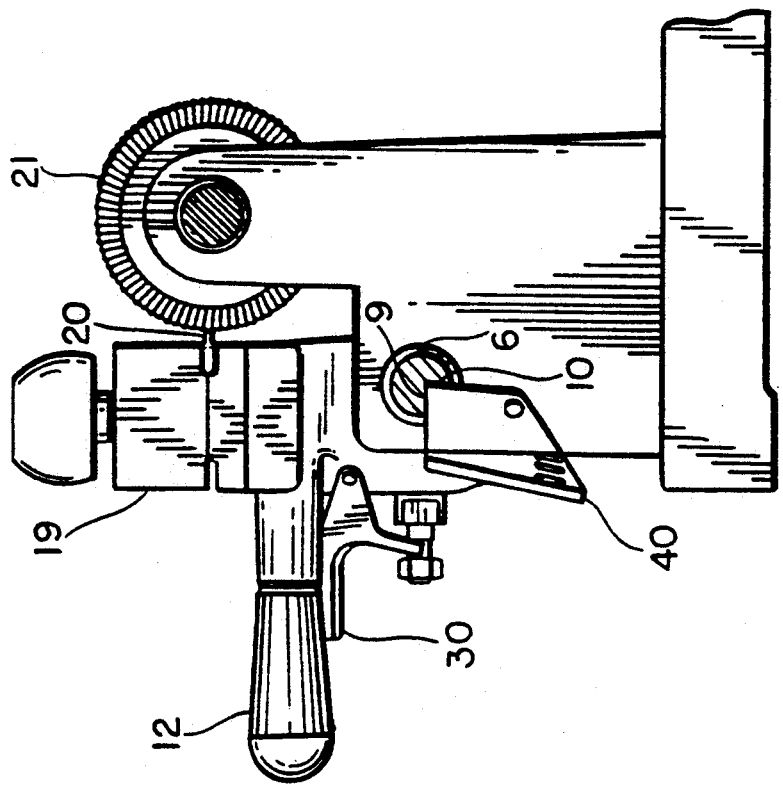
FIG. 6 shows the machine in an operative state for automatically cutting a key.
Figure 8:
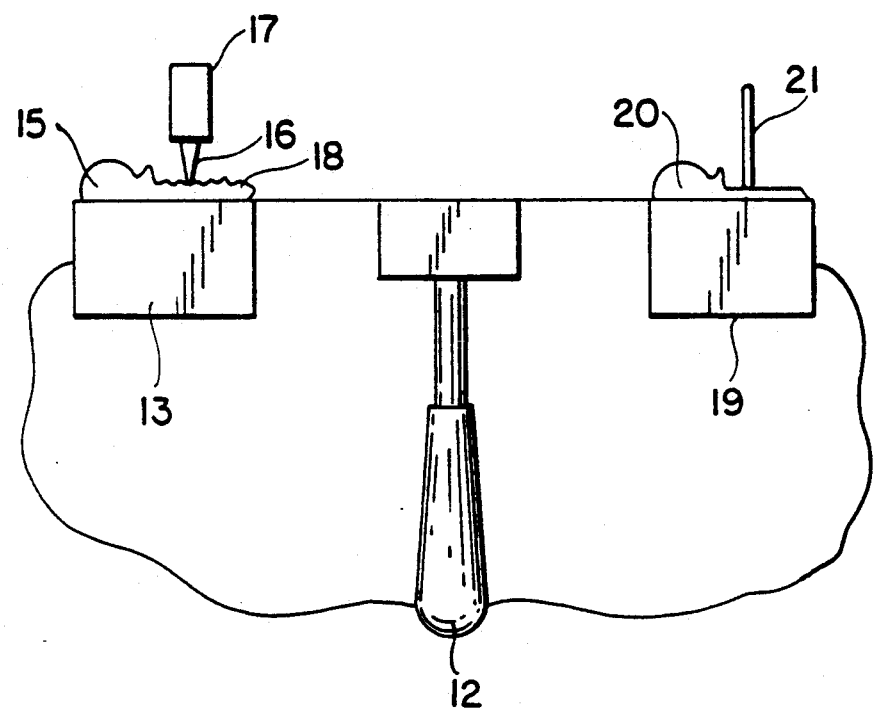
FIG. 8 is a plan view of a portion of the carrier showing the key vises and keys therein.

A torsion spring 25 surrounds shaft 6 and has one end secured to the carriage 11 and an opposite end secured to the shaft 6 to exert forces on the carriage and on the shaft to urge the carriage 11 in a clockwise direction from the rearwardly tilted position shown in FIG. 2 to the upright position in FIGS. 4 and 6. In the rearwardly tilted position shown in FIG. 2, the carriage is in an inoperative state whereas in FIGS. 4 and 6 in its upright position, the carriage 11 is in an operative position in which the blank key 20 can be cut. This will be explained in greater detail later.

Figure 7:
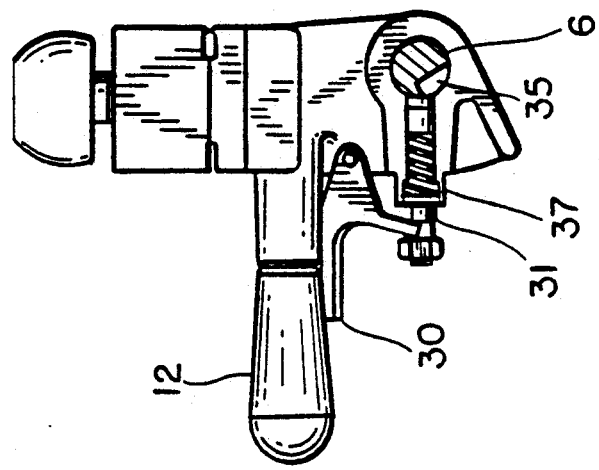
FIG. 7 shows a detail of the internal elements of the latching means of the machine in the state in FIG. 6.

A latch means which controls the operation of the key cutting machine between manual and automatic modes of operation, comprises a trigger 30 pivotably mounted on the carriage 11 in a juxtaposed position beneath the handle 12 such that the handle 12 can be manually engaged by the hand of the user and a finger of the same hand can be comfortably fitted on the trigger 30 either to bring the trigger into a position adjacent to the handle as shown in FIG. 6, or to leave the trigger in its normal state as shown in FIG. 2. A latch pin 31 is slidably fitted in the carriage 11 and rides in a slot 32 in a depending leg 33 of the trigger 30. Hence, when the trigger 30 is pivoted by the finger action of the operator, the latch pin 31 undergoes sliding movement in the carriage. The latch pin 31 has an end portion 34 which faces a notch 35 in the shaft 6. A spring 36 acts between the end portion 34 and a cup retainer 37 secured to the carriage to urge the end portion 34 of the latching pin into the notch 35 of the shaft 6. As shown in FIG. 7, when the trigger 30 is lifted to a position adjacent to the handle 12, the latch pin 31 is removed from the notch 35 in the shaft 6. This represents the operative state for the manual mode of operation of the key machine as will be explained in more detail later.

The latch means further comprises a latch member 40 which is pivotably connected to cheek 4 and is lightly biased by a weak spring 41 to urge a corner 42 of the latch member 40 into the notch in the end 8 of the shaft 6 (FIGS. 2 and 6). When the corner 42 of the latch member 40 is engaged in the notch in the shaft 6, the shaft 6 is prevented from undergoing counterclockwise rotation as shown in FIG. 2. However, if shaft 6 is rotated clockwise, the latch member 40 can be pivoted around its pivot 43 against the action of spring 41.

In the position of the trigger 30 shown in FIG. 2, the latch pin 31 engages in the notch 35 of shaft 6 and thereby blocks any relative rotation between the shaft 6 and the carriage by spring 25. Hence, in the lower position of the trigger as shown in FIG. 2, the spring 25 is effectively disengaged, and the carriage and shaft are freely rotatable as a unit relative to the frame 3. This represents the configuration for the manual mode of operation. When the trigger 30 is lifted to the position shown in FIG. 6, the latch pin 31 is withdrawn from notch 35 and the spring 25 now acts on the shaft 6 and the carriage 11. Since the shaft is retained by the latch member 40, the carriage is urged to the upright position shown in FIG. 6 and the latch pin 31 remains outside the notch 35 and bears against the outer surface of shaft 6. This represents the configuration of the machine in the automatic mode of operation.

In order to drive the machine in the automatic mode of operation, a drive means is provided which comprises a drive motor 50. The drive motor 50 is drivingly connected to a cam 51 through a switch 52 to drive the cam in rotation. The cam 51 engages a cam roller 53 mounted at one end of a pivotal link 54 whose other end is connected by a pin 55 to a link 56. The link 56 is connected by a link pin 57 to the shaft 6. The link pin 57 permits rotation between the shaft 6 and the link 56 but transmits axial force between the link 56 and the shaft 6. In the particular embodiment, the link pin 57 is threadably engaged in a threaded bore in the end of shaft 6. The cam 51 carries a switch actuator 58 which cooperates with switch 52 so that the cam will undergo one cycle of a 360° rotation each time motor 50 is actuated. A new cycle of operation of motor 50 is commenced by an override switch 59. When the switch 59 is actuated, the motor 50 drives cam 51 in rotation to displace cam roller 53 in the direction of the arrow in FIG. 1 which produces pivotal movement of lever 54 which acts through link 56 to apply a pulling force on the shaft 6. The carriage 11 is displaced with the shaft 6 causing the master key 15 in vise 13 to travel past the tracer bar 16 so that the carriage 11 will undergo pivotal movements in accordance with the pattern on the master key and the cutter wheel 21 will cut the blank key 20 in correspondence therewith and duplicate the pattern 18 on the master key. The cutter wheel 21 is driven from the motor 50 by a drive belt 60 during the period of drive of the cam 51. When the cam 51 has reached the end of its cycle, the actuator 58 will act on switch 52 to halt the drive of motor 50.

Figure 1:
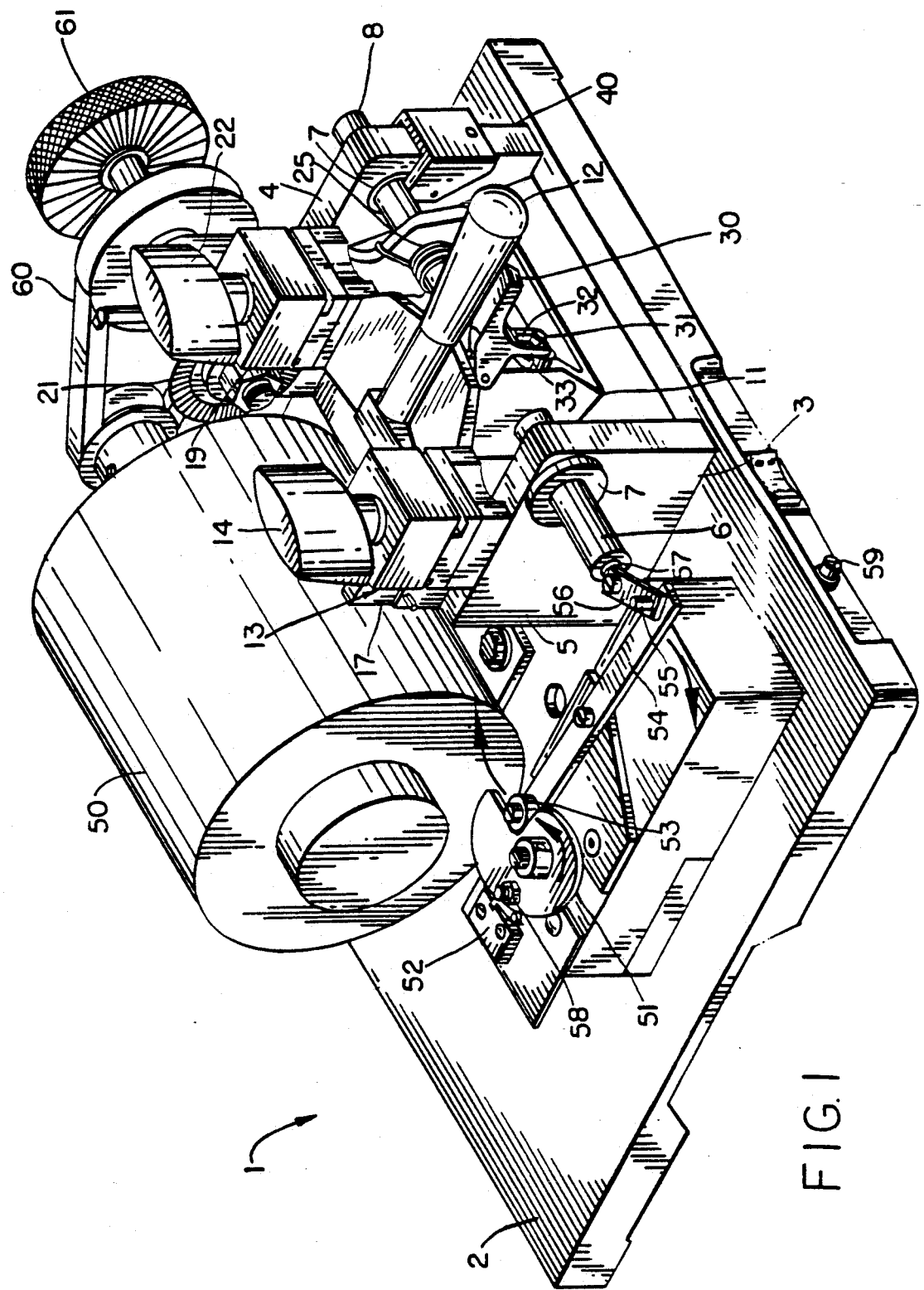
FIG. 1 is a side, perspective view from the top of a key cutting machine according to the invention.
Figure 3:
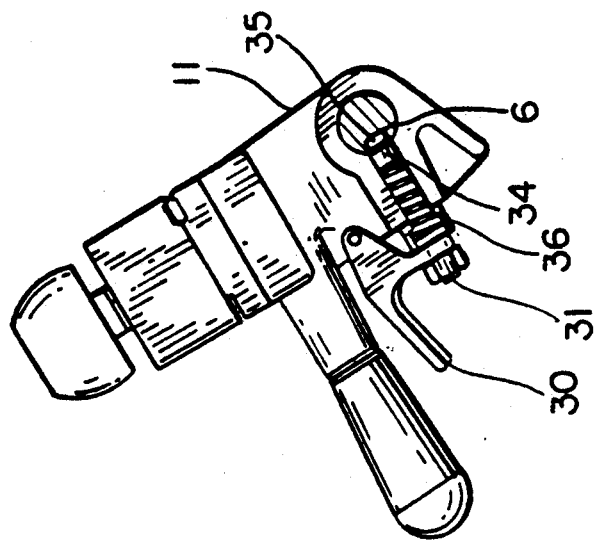
FIG. 3 shows a detail of internal elements of the latching means of the machine in the state in FIG. 2.
Figure 2:
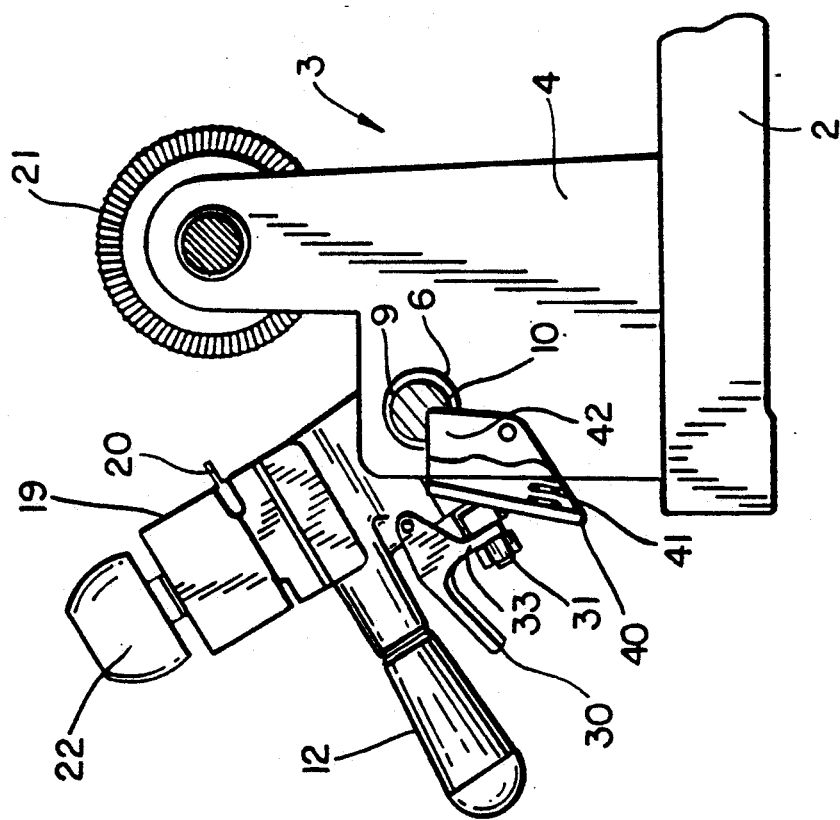
FIG. 2 is a side elevational view as seen from the right in FIG. 1 showing part of the machine in an inoperative state.

It is significant to note that with the construction of the drive means of the invention, the shaft 6 is pulled laterally from right to left in FIG. 1. Thereby the cam 51 and the linkage can be placed at the left side of the machine where there is no interference with the cutter wheel 21 and the drive belt 60. Additionally, a buffer wheel 61 is also placed at the right end of the machine and is driven from the motor 50 to clean the cut key and remove any burrs therefrom. This is a manual operation which is carried out after the cut key 20 has been removed from the vise 19.

The manual mode of operation of the key machine is carried out as follows. After the master key 15 and the blank key 20 are engaged in vises 13 and 19, respectively, the operator engages the handle 12 to pivot the carriage from its inoperative, tilted position as shown in FIG. 2 to the operative position as shown in FIG. 4. The trigger 30 remains in its lowered position and the end portion 34 of latch pin 31 engages in notch 35 of shaft 6. The shaft and carriage are thereby locked together for common rotation. The latch member 40 allows the free rotation of shaft 6, against the very low force applied by the weak spring 41. No significant spring tension is felt by the operator because the latch pin 31 is resisting the force of the strong torsion spring 25. In this state, the motor 50 and cam 51 remain at rest and the carriage 11 is manually displaced by the operator to cause the master key 15 to move past tracer bar 16 so that the cutter wheel 21 will cut the pattern on the master key in the key blank 20. The lever member 54 remains at rest and the rotation of the shaft 6 is permitted due to the threaded link pin 57 which rotates inside the shaft 6.

In the automatic mode of operation, the trigger 30 is lifted by the finger of the operator, whose hand grasps the handle 12, to release the latch pin 31 from the shaft. The torque applied by the torsion spring 25 now acts on the carriage 11 and on the latch member 40. The latch member 40 and the shaft 6 remain stationary during the rotation of the carriage from the inoperative to the operative position and the latch member 40 acts as an anchor point for the shaft 6. The operator then presses the override switch 59 which commences one cycle of operation of the cam 51 which causes the carriage 11 to traverse the tracer bar 16 and the cutter wheel 21 so that the key 20 is cut with the pattern 18 on the master key. 15. The spring 25 acts on the carriage 11 to resiliently press the keys 15 and 20, respectively against the tracer bar 16 and cutter wheel 21. After the cam 51 has undergone a 360° rotation, the switch 52 is actuated to interrupt the power to the drive motor 50. After the blank key has been cut, the operator engages handle 12 to tilt the carriage 11 to its inoperative position whereupon the latch pin 31 will now engage the shaft 6 under the pressure of the spring 36. The tension in torsion spring 25 is now disengaged from the carriage.

As evident from the above, the key cutting machine can be operated between automatic and manual modes of operation by a single manipulation of the trigger 30. Moreover, this can be achieved with one hand of the operator. Currently available machines require considerably more effort to switch between manual and automatic modes of operation and require two-handed operation to cut a key automatically. The one-handed operation of the machine of the invention is particularly effective due to the position and operation of the trigger 30 which allows the tension of spring 25 to be applied to the carriage 11 only during the automatic operation of the machine. Heretofore, the operator has been required to engage the carriage spring, for example, by engaging a pin in a groove or guiding a pin under a spring plate in order to release the pressure of the spring on the carriage. Furthermore, the trigger 30 is ergonometrically designed so that it can be easily operated to actuate the latch pin by a single finger operation. The release of the trigger also simplifies the conversion of the machine to its manual mode.

Although the invention has been described in relation to a specific embodiment thereof, it will become apparent to those skilled in the art that numerous modifications and variations can be made within the scope and spirit of the invention as defined in the attached claims.

What is claimed is:

1. A key cutting machine having manual and automatic modes of operation comprising a carriage including clamp means for securing a blank key and a master key on the carriage, a support shaft supporting said carriage for pivotal movement between a first, operative key cutting position and a second inoperative position, manually engageable handle means on said carriage for moving said carriage, fixed tracer means for contacting the master key when the carriage is in said operative position, spring means between said shaft and said carriage for urging relative rotation therebetween, cutting means for contacting and cutting the blank key when the carriage is in said operative position, latch means having one state, for a manual mode of operation, in which the carriage and the shaft are locked for common rotation, and a second state, for an automatic mode of operation, in which the shaft is locked and the carriage is unlocked from the shaft and is pivoted on said shaft by said spring means to said operative position, and drive means for axially displacing said shaft, and said carriage therewith, in the operative position in the automatic mode of operation.

2. A key cutting machine as claimed in claim 1, wherein said latch means comprises a movable latch pin having a first position in which the shaft and carriage are locked against relative rotation and a second position in which said shaft and carriage are unlocked and can undergo relative rotation.

3. A key cutting machine as claimed in claim 2, wherein said latch means further comprises a trigger juxtaposed with said handle means and connected to said latch pin for movement thereof between said first and second positions.

4. A key cutting machine as claimed in claim 3, wherein said trigger is positioned adjacent to said handle means in a position in which a user can grasp the handle means with one hand and operate the trigger with a finger of the same hand.

5. A key cutting machine as claimed in claim 4, wherein said handle means comprises a handle member and said trigger is disposed directly beneath said handle member.

6. A key cutting machine as claimed in claim 1, wherein said spring means comprises a torsion spring connected to said shaft and said carriage.

7. A key cutting machine as claimed in claim 3, wherein said trigger has one position in which said latch pin is disengaged from said shaft, and a second position in which said latch pin engages said shaft and couples said carriage and said shaft for common rotation.

8. A key cutting machine as claimed in claim 7, wherein said trigger is pivotably supported by said carriage, said latch pin being slidable in said carriage and being coupled to said trigger for being slidably moved in said carriage as said trigger is pivotably moved.

9. A key cutting machine as claimed in claim 8, wherein said shaft has a notch into which said latch pin is engaged in said first position thereof by said trigger.

10. A key cutting machine as claimed in claim 9, comprising a biassing spring acting on said latch pin to urge the latch pin to engage in said notch in said shaft.

11. A key cutting machine as claimed in claim 10, wherein said latch means further includes a spring-loaded pivotal latch member engaging said shaft to resiliently oppose pivotal movement of said shaft and said carriage therewith when the carriage is pivotably moved to said operative position and said latch pin is engaged with said shaft.

12. A key cutting machine as claimed in claim 10, wherein said latch member remains engaged with said shaft to prevent rotation thereof when said carriage is pivotably moved to said operative position and said latch pin is disengaged from said notch in said shaft.

13. A key cutting machine as claimed in claim 12, wherein said latch pin bears on said shaft, under the action of said biassing spring, when said latch pin is disengaged from said notch and said trigger remains in said one position.

14. A key cutting machine as claimed in claim 1, wherein said drive means comprises a drive motor, a cam driven by said drive motor and a linkage coupled to said shaft and said cam for axially displacing the shaft in response to the drive of said cam by said drive motor.

15. A key cutting machine as claimed in claim 14, wherein said linkage is coupled to said shaft to pull the shaft and the carriage therewith when the drive motor is operated.

16. A key cutting machine as claimed in claim 15, wherein said drive means further comprises switch means for activating said motor to drive the cam through one cycle of operation.

17. A key cutting machine as claimed in claim 15, wherein said linkage includes a pivotal lever, a cam roller on said lever engaged with said cam to pivot said lever in response to rotation of said cam, a link pivotally connected to said lever, and a link pin engaging said shaft and connected to said link to axially displace said shaft while being relatively rotatable with respect thereto.

18. A key cutting machine as claimed in claim 17, wherein said link pin is threaded in said shaft.

19. A key cutting machine as claimed in claim 17, wherein said switch means comprises a switch controlling drive of said drive motor, said cam including means for contacting said switch to deactivate said drive motor after said cam has been driven through one cycle of operation.

20. A key cutting machine having manual and automatic modes of operation comprising:

a shaft,
a pivotal carriage on said shaft,
key clamp means on said carriage,
cutting means for cutting a key in the key clamp means,
spring means between the carriage and the shaft for urging the same to undergo relative rotation,
latch means having one state for locking the carriage and the shaft for common rotation for a manual key cutting operation and a second state in which the carriage is urged by the spring means towards the cutting means for an automatic key cutting operation, and
drive means for axially moving the shaft and the carriage therewith in the automatic key cutting operation.

21. A machine as claimed in claim 20, comprising a handle on said carriage to manually move the carriage in said manual key cutting operation, said latch means including a trigger for changing the state of the latch means.

22. A machine as claimed in claim 21, wherein said trigger and said handle are juxtaposed to be operated by one hand of the user.

23. A machine as claimed in claim 20, wherein said drive means acts on said shaft to pull the shaft axially past said cutting means.

* * * * *